J. W. BULLER.
COUPLING.
APPLICATION FILED FEB. 3, 1917.

1,240,818.

Patented Sept. 25, 1917.

WITNESSES
H. Diehl.
A. L. Kitchin.

INVENTOR
Jacob W. Buller
BY
ATTORNEYS

UNITED STATES PATENT OFFICE.

JACOB WIENS BULLER, OF HILLSBORO, KANSAS.

COUPLING.

1,240,818.   Specification of Letters Patent.   Patented Sept. 25, 1917.

Application filed February 3, 1917. Serial No. 146,385.

*To all whom it may concern:*

Be it known that I, JACOB W. BULLER, a citizen of the United States, and a resident of Hillsboro, in the county of Marion and State of Kansas, have invented a new and Improved Coupling, of which the following is a full, clear, and exact description.

This invention relates to coupling devices and particularly to an improved coupling device to be used in a tractor and trailer or between the various trailers, and has for an object the provision of an improved arrangement of coupler which may be quickly and easily coupled and uncoupled but which is pivotally locked when in a coupled or closed position.

Another object in view is to provide a coupling structure having a coupling head and a coupling link formed with resilient means for taking up the up and down motion between the parts.

A still further object in view is to provide a coupling device in which a vertically movable block is utilized for holding the coupling jaws in a locked position.

Figure 1:
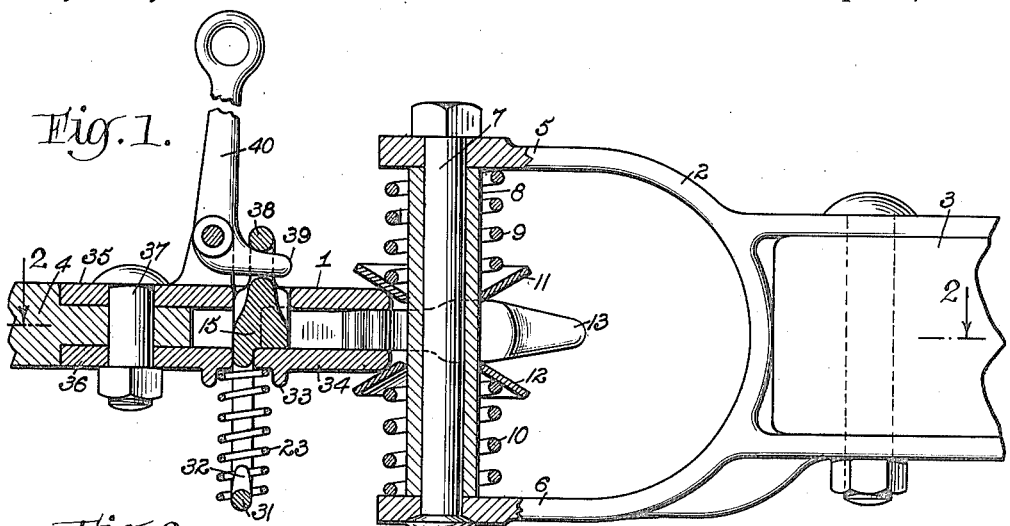
Figure 1 is a longitudinal vertical sectional view through a coupling disclosing an embodiment of the invention.
Figure 2:
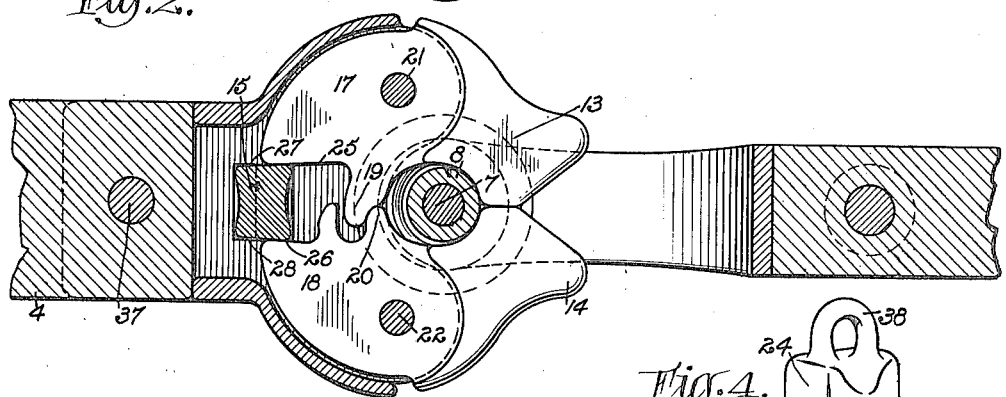
Fig. 2 is a horizontal section through Fig. 1 on line 2—2.
Figure 3:
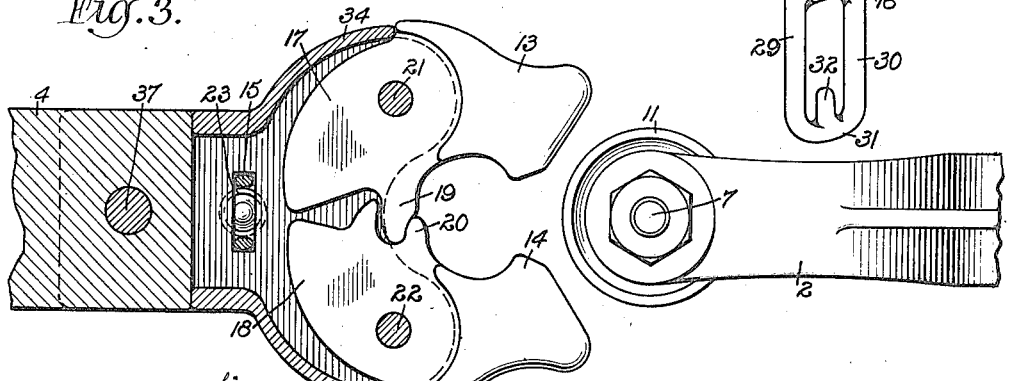
Fig. 3 is a view similar to Fig. 2 except that the jaws are shown open ready to receive part of the coupling structure coacting with the head.
Figure 4:
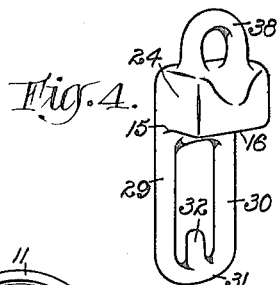
Fig. 4 is a detail perspective view of the locking block shown in Figs. 1 and 2.

Referring to the accompanying drawing by numerals, 1 indicates broadly the coupling head and 2 the coupling link, said link 2 being connected to the tongue 3 of a tractor, for instance, while the coupling head 1 is connected to the tongue 4 of the trailer, though it will be evident that the coupling head 1 could be connected with the tractor and the link 2 connected with the trailer. In forming the link 2 the same is provided with arms 5 and 6 for accommodating the bar 7 which is surrounded by sleeve 8 carrying springs 9 and 10. Springs 9 and 10 bear against the arms 5 and 6 and against conical-shaped washers 11 and 12. The tendency of springs 9 and 10 is to force the washers together but by reason of their conical shape the jaws 13 and 14 may freely enter and spread the washers until the parts assume the position shown in Figs. 1 and 2. When the parts are in the position shown in Fig. 3 the locking block 15 is raised until the lower face or shoulder 16 rests on top of the locking extensions 17 and 18 of the jaws 13 and 14. As soon as the sleeve 8 presses against the interlocking members or teeth 19 and 20 said interlocking members are moved pivotally on the pins 21 and 22 until the parts assume the position shown in Fig. 2, whereupon the spring 23 will force the locking block downwardly until the enlargement 24 is positioned as shown in Fig. 2, whereupon the link and head cannot be pulled apart until the locking block has been removed.

In forming the locking extensions 17 and 18 the same are provided with slightly inclined walls 25 and 26 for providing a dovetailed socket for receiving the slightly beveled walls 27 and 28 of the block 15. This will positively prevent the accidental disengagement of the locking block from the jaws. The locking block 15 is provided with a downwardly extending pair of members 29 and 30 having a cross piece 31 at the bottom supporting a stud 32 over which part of the spring 23 fits, the opposite end of the spring fitting within the upstanding portion 33 of the bottom part of the casing 34. It will be noted that the pins 21 and 22 connect the jaws 13 and 14 to the casing 24 and said casing is provided with extensions 35 and 36 at the rear overlapping part of the tongue 4 so that the bolt 37 may connect the tongue and the casing. The upper end of the locking block 15 is provided with a looped structure 38 for receiving the end 39 of the lever 40, which lever is formed with an eyelet at the upper end for receiving a rod, wire, cable or other means whereby the lever may be actuated from a distance for raising the same.

Figure 5:
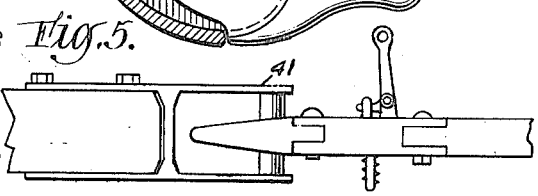
Fig. 5 is a side view of a slightly modified form of coupling link.

In uncoupling, lever 40 is moved until the shoulder or face 16 is above the extensions 17 and 18, whereupon the jaws may open, and as soon as they have been opened the lever 40 may be released, after which the block will rest on members 17 and 18. In this position the coupler is ready to be coupled at any time to another link or to the modified link structure 41 as shown in Fig. 5, wherein the springs 9 and 10 and associated parts have been omitted.

What I claim is:

1. A coupling comprising a head, a pair of articulated jaws pivotally mounted so that part will extend into said head, said part extending into the head forming locking extensions, a sliding block movable at right angles to the plane of movement of said jaws, said block being formed with a substantially squared portion, an extension on the upper part for accommodating the lifting member and a projection on the lower part having a spring centering device, and a spring resting on said centering device and acting against said head for tending to keep said squared portion in a lowered position and between said locking extensions.

2. A coupling comprising a head provided with locking jaws, means for locking said jaws in a closed position, a locking link provided with a bar adapted to be grasped by said jaws, and resilient operable members engaging said jaws for resisting vertical up and down movement of said jaws, said members comprising a pair of washers and a spring engaging each washer, said springs being arranged to continually urge the washers toward each other.

3. A coupling member comprising a coupling head provided with locking jaws, means for locking said jaws closed, a link provided with a bar gripped by said jaws, a pair of washers surrounding said bar, there being one washer arranged on each side of said coupling head, and means acting on said washers for pressing the same against said head, said means resiliently resisting movement of the head longitudinally of said bar.

JACOB WIENS BULLER.